No. 612,112. Patented Oct. 11, 1898.
J. KNOOP.
HARROW.
(Application filed Mar. 14, 1898.)
(No Model.) 2 Sheets—Sheet 1.
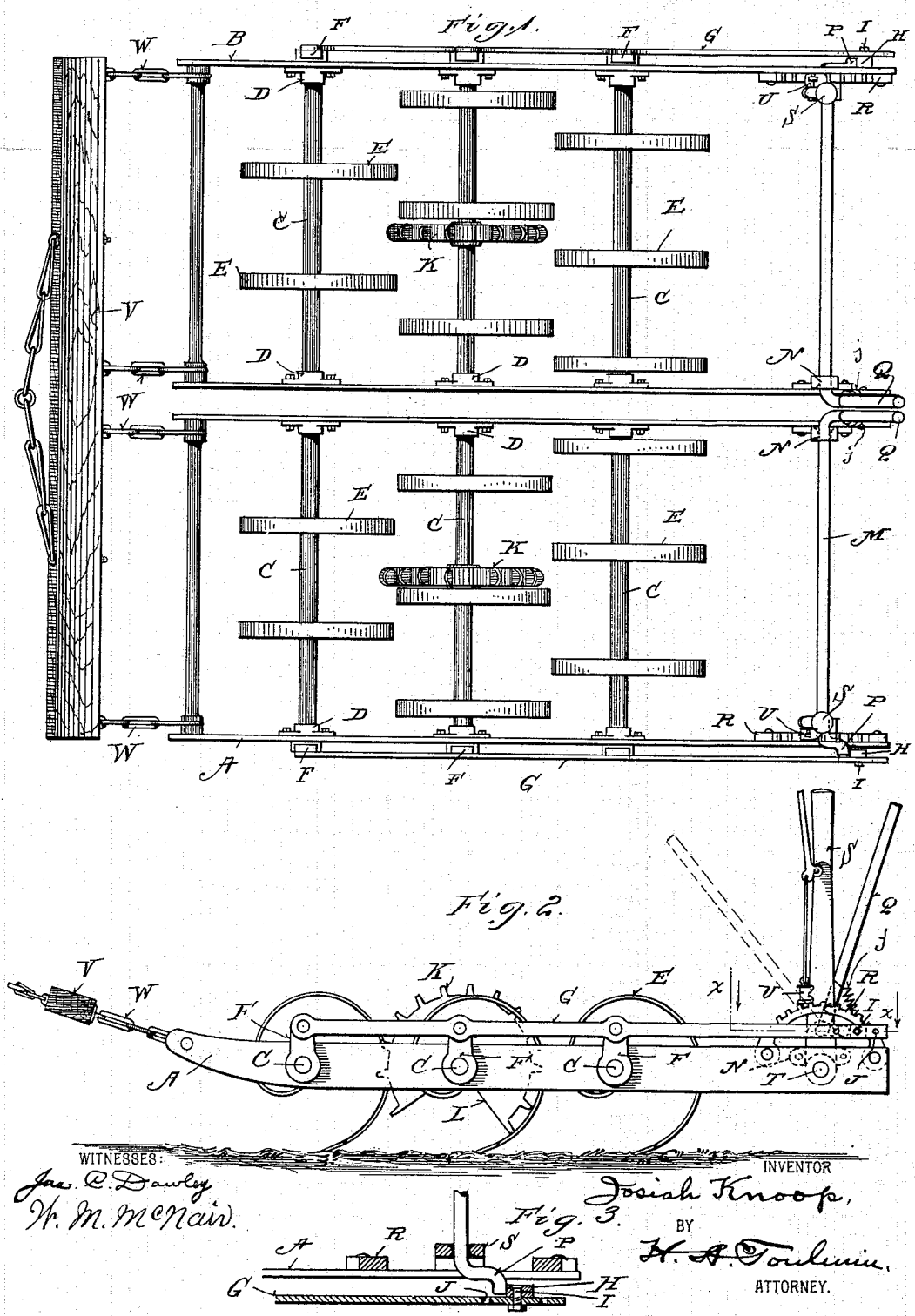
WITNESSES:
Jas. C. Dawley
W. M. McNair
INVENTOR
Josiah Knoop,
BY
H. A. Toulmin.
ATTORNEY.

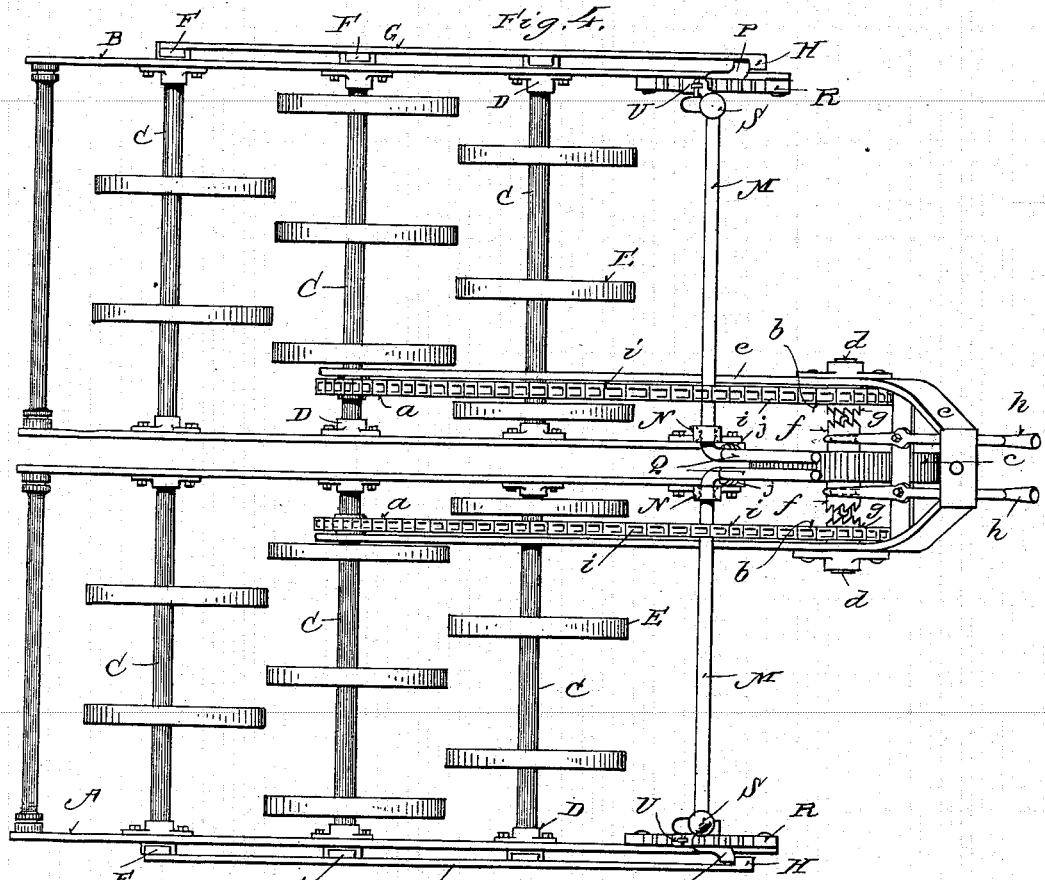
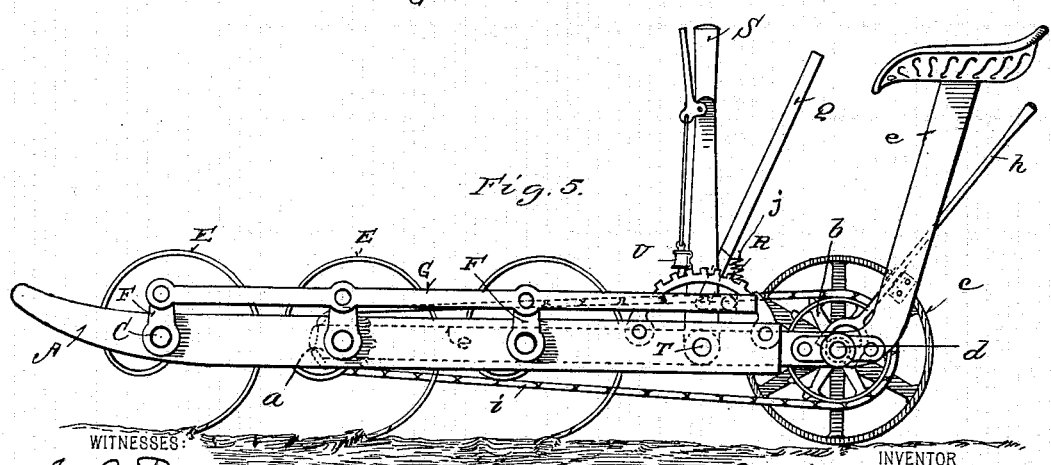

UNITED STATES PATENT OFFICE.

JOSIAH KNOOP, OF CASSTOWN, OHIO.

HARROW.

SPECIFICATION forming part of Letters Patent No. 612,112, dated October 11, 1898.

Application filed March 14, 1898. Serial No. 673,685. (No model.)

*To all whom it may concern:*

Be it known that I, JOSIAH KNOOP, a citizen of the United States, residing at Casstown, in the county of Miami and State of Ohio, have invented certain new and useful Improvements in Harrows, of which the following is a specification, reference being had therein to the accompanying drawings.

This invention relates to certain new and useful improvements in harrows.

The object of my invention is to provide means for rotating the harrow-teeth to permit the ready discharge of dirt or trash which from time to time collects beneath the harrow, thus interfering with the proper tillage of the soil.

My invention relates to details of construction and arrangement hereinafter appearing, and particularly pointed out in the claims.

In the accompanying drawings, on which like reference-letters indicate corresponding parts, Figure 1 is a plan view of a harrow with my improvements applied thereto. Fig. 2 is a side view of the same. Fig. 3 is a detail sectional view on the line *x x* of Fig. 2. Fig. 4 is a similar view to Fig. 1, showing another form of mechanism for rotating the teeth; and Fig. 5 is a side view of the same.

The letters A and B represent suitable frame structures for the respective sections of my harrow, although it will be understood that but one section may be employed, if desired.

The letter C represents suitable shafts rotatably mounted in bearings, such as shown at D. To these shafts I attach at suitable intervals teeth E by any of the already-employed methods. It will be seen that one end of each of these shafts projects beyond the frames A and B, respectively, and has attached to such extension a crank F, as clearly shown in Fig. 2. To the upper end of these cranks F is attached a pitman G, and to the rear end of this pitman is secured a block H by means of a bolt I. This block may be adjusted on this pitman, as indicated, by the several holes J in the pitman. This adjustment is for a purpose which will hereinafter appear.

Upon one or more of the shafts C, I secure as many toothed wheels K as may be necessary or desirable. It will be seen that these toothed wheels are partially cut out, as shown at L. This is for the purpose of permitting said notched wheel to be out of contact with the ground when the harrow is working smoothly and before the mechanism for permitting these toothed wheels to engage with the soil is manipulated, as will presently appear.

Preferably to the rear of this harrow I attach a rock-shaft M, which is mounted in a fixed bearing N in the lever S. At one end this rock-shaft is bent in the form of a crank, as shown at P. This crank is adapted to engage with the block H to hold the pitman in its normal position when the harrow-teeth are cultivating the soil. The other end of this rock-shaft M is turned up to form an operating-lever Q. When this operating-lever is in its full-line position, as shown in Fig. 2, the pull of the pitman is directly through "dead-centers," so to speak, and the crank P has no tendency to rise, and consequently the lever Q will retain its full-line position; but when this lever is operated to the position as shown in dotted lines in Fig. 2 the crank P is raised from engagement with the block H, and the pitman is permitted to move forward by means of the strain on the cultivating-teeth when in engagement with the soil. As soon as this pitman moves forward a short distance the teeth of the wheel K will be brought in contact with the ground, when they will be further assisted in completely rotating the teeth and shafts C even though but one of these toothed wheels may be used for each section, since all the shafts are connected to the pitman. When the shafts are completely rotated and the tooth has made a complete revolution and again come into operating contact with the soil, the block H again engages with the crank P, which has in the meantime been returned to its normal position by the operator or a spring *j* by reason of moving the operating-lever from the dotted position back to the full-line position as viewed in Fig. 2. Thus the teeth are again locked in their operating position, and whatever trash or dirt they may have accumulated has been dumped or left behind. Preferably at or near the rear end I attach a toothed segment R, and to the rear cross-piece of the frame I pivot the lever S, as shown at T in Fig. 2. A suitable detent U is adapted to engage with and be disengaged from this toothed segment, and by moving the lever S the teeth are set shallower or deeper, as desired. The rock-shaft M extends through this lever and moves therewith, the bearing N being so formed as to permit of this back-and-forth movement of the shaft.

Referring again to the lever mechanism for adjusting the teeth to run shallower or deeper, it will be seen that I may dispense with such mechanism altogether and accomplish the same result by simply adjusting the block H on the pitman G. The block H may be cast to the pitman where the lever-adjusting mechanism is used, and I do not wish to confine myself to the particular form illustrated.

So far I have described but one section of my harrow; but it will be understood that the other section is similarly constructed, and hence a description of one will apply as well to the other. A draft bar or beam V is connected to the harrow by means of short chains W or any other suitable mechanism.

I will now refer to the second form of my improvements—namely, the form shown in Figs. 4 and 5. In this form I employ the same pitman connection and the same mechanism for adjusting the teeth in or out of the ground, as also the same form of locking mechanism for holding the pitman in its adjusted positions, but employ different mechanism for rotating the shafts to which the harrow-teeth are secured. This mechanism consists of a sprocket-wheel $a$, mounted on one of the rotatable shafts C, and a sprocket-wheel $b$, mounted on a suitable auxiliary shaft $d$, carried by a frame $e$, extending from the harrow proper. Upon this shaft $d$ is secured a ground-wheel $c$ and also a toothed sleeve $f$, which is permitted to be slid on the shaft to engage with matching teeth on the sprocket-wheel $b$, as shown at $g$, but which is fixed to the shaft, so that when the wheel $c$ and the shaft $d$ revolve the sleeve $f$ will revolve. When, therefore, the sleeve $f$ is thrown into engagement with the sprocket-wheel $d$ by means of the operating-lever $h$, the rotary motion thus imparted to the sprocket-wheel will be transmitted through the sprocket-chain $i$ to the sprocket-wheel $a$, mounted on one of the rotatable shafts carried by the harrow-frame. The teeth are thus rotated with the shaft, and inasmuch as all the shafts are connected by the pitman and cranks they will turn simultaneously and the teeth are consequently all rotated together. As soon as they have completed their revolution the lever $h$ is operated to throw the clutch-sleeve $f$ out of engagement with the sprocket-wheel. The other section of the harrow is operated in a similar manner and the parts are similarly lettered.

Having thus fully described my invention, what I claim as new, and desire to secure by Letters Patent, is—

1. In a harrow, the combination with a suitable frame having one or more rotatable tooth-carrying shafts mounted therein, of a toothed wheel, having a section removed, rigidly mounted on one of said shafts, and normally out of engagement with the ground, and means to rotate said wheel whereby the teeth are brought into engagement with the ground.

2. In a harrow, the combination with a suitable frame structure having one or more rotatable tooth-carrying shafts mounted therein, said shafts extending beyond said frame at one end, of a pitman and crank mechanism to connect with each of said rotatable shafts, and mechanism to engage with and disengage from said pitman, and means to rotate said shafts when the pitman-holding mechanism is disengaged.

3. In a harrow, the combination with a frame structure having one or more rotatable tooth-carrying shafts mounted therein, a pitman connected with each of said shafts, and means to engage with and disengage from said pitman, and other means to rotate said shafts or shaft when said pitman is disengaged.

4. In a harrow, the combination with a frame having one or more tooth-carrying shafts mounted therein, a pitman connected with each of said shafts, a movable block connected with said pitman and an operating rock-shaft adapted to engage said block to hold the pitman in its normal position and to disengage from said block to free the pitman and permit the tooth-carrying shafts to rotate.

5. In a harrow, the combination with a suitable frame having one or more tooth-carrying shafts mounted therein and adapted to be rotated, a pitman connected with each of said shafts, an operating rock-shaft to engage with and disengage therefrom, and means to rotate said tooth-carrying shafts when the operating rock-shaft is out of engagement with said pitman.

6. In a harrow, the combination with a frame structure having one or more tooth-carrying rotatable shafts mounted therein, and means to rotate said shafts, a pitman connected with each of said shafts, an operating rock-shaft engaging with said pitman, mechanism, including a lever, also carried by said frame, said mechanism adapted to set the teeth to run shallower or deeper in the ground, and the operating rock-shaft passing through said lever and adapted to move therewith.

7. In a harrow, the combination with a suitable frame having tooth-carrying shafts mounted therein, a sprocket-wheel connected with one of said shafts, a sprocket-wheel mounted on an auxiliary shaft, a chain connecting said sprocket-wheels, a ground-wheel adapted to drive said last-named shaft, and means secured to such shaft and adapted to engage with and disengage from the sprocket-wheel thereon whereby the sprocket-chain is operated, and means for connecting the other tooth-carrying shafts with said chain-operated shaft.

8. In a harrow, the combination with a frame having toothed shafts mounted therein, means for connecting said shafts together, a sprocket-wheel on one of said shafts, an auxiliary shaft carrying a driving-sprocket having clutch-teeth thereon and adapted to be rotated by a ground-wheel, a slidable clutch keyed to said shaft, mechanism for moving said clutch into engagement with and disengagement from the teeth of said driving-sprocket, of a sprocket-chain for connecting said sprocket-wheels together whereby the tooth-carrying shafts are rotated.

In testimony whereof I affix my signature in presence of two witnesses.

JOSIAH KNOOP.

Witnesses:
GEORGE C. KNOOP,
G. W. FULLER.